(12) United States Patent
Dahl et al.

(10) Patent No.: US 8,672,671 B2
(45) Date of Patent: Mar. 18, 2014

(54) CHEMICAL LOOPING COMBUSTION

(75) Inventors: Ivar Martin Dahl, Oslo (NO); Richard Blom, Oslo (NO)

(73) Assignee: Sinvent AS, Trondheim (NO)

( * ) Notice: Subject to any disclaimer, the term of this patent is extended or adjusted under 35 U.S.C. 154(b) by 899 days.

(21) Appl. No.: 12/444,726

(22) PCT Filed: Oct. 11, 2007

(86) PCT No.: PCT/NO2007/000357
§ 371 (c)(1),
(2), (4) Date: Dec. 14, 2009

(87) PCT Pub. No.: WO2008/044942
PCT Pub. Date: Apr. 17, 2008

(65) Prior Publication Data
US 2010/0092898 A1      Apr. 15, 2010

(30) Foreign Application Priority Data

Oct. 11, 2006   (NO) .................................. 20064636

(51) Int. Cl.
*F23D 3/40*          (2006.01)
(52) U.S. Cl.
USPC .............................................. 431/7; 423/231
(58) Field of Classification Search
USPC .......... 431/7, 5, 170; 422/169, 178, 174, 171, 422/175, 173, 182, 177; 110/203, 204, 210, 110/211, 212; 432/181, 182; 55/73, 77, 55/390; 95/45, 51, 52, 113, 137; 96/125–126; 423/231
See application file for complete search history.

(56) References Cited

U.S. PATENT DOCUMENTS

| | | | | |
|---|---|---|---|---|
| 1,949,205 A | * | 2/1934 | Herring et al. | 422/222 |
| 2,704,741 A | * | 3/1955 | Thayer | 208/176 |
| 2,739,928 A | * | 3/1956 | Thayer | 208/150 |
| 2,934,495 A | * | 4/1960 | Worth | 208/176 |
| 3,780,498 A | * | 12/1973 | Wenner | 95/113 |
| 4,032,429 A | * | 6/1977 | Cronauer et al. | 208/422 |

(Continued)

FOREIGN PATENT DOCUMENTS

FR        2846710 B1 *  5/2004
WO    WO 9606303 A1 *  2/1996

OTHER PUBLICATIONS

Mattisson et al., The use of NiO as an oxygen carrier in chemical-looping combustion, Mar. 15, 2005, Science Direct, 12-Pages.*

*Primary Examiner* — Kenneth Rinehart
*Assistant Examiner* — Bao D Nguyen
(74) *Attorney, Agent, or Firm* — Conley Rose, P.C.

(57) ABSTRACT

The present invention comprises a method and reactor of chemical looping combustion involving at least two gases in a reactor in which: said at least two gases are conveyed to a reactor fluid inlet center which is divided in at least two sectors; said at least two gases flow radially outward into an oxygen carrier bed that surrounds said fluid inlet center, said oxygen carrier bed comprising an active material, in which at least one reaction takes place between said active material and said at least two gases; effluents from said at least one reaction are conveyed to an outer compartment of the reactor, said compartment being divided in two sections by means of two radially extending partition walls, said fluid inlet center, said oxygen carrier bed and said outer compartment are rotating relative to each other.

18 Claims, 4 Drawing Sheets

(56) References Cited

U.S. PATENT DOCUMENTS

Figure 1:
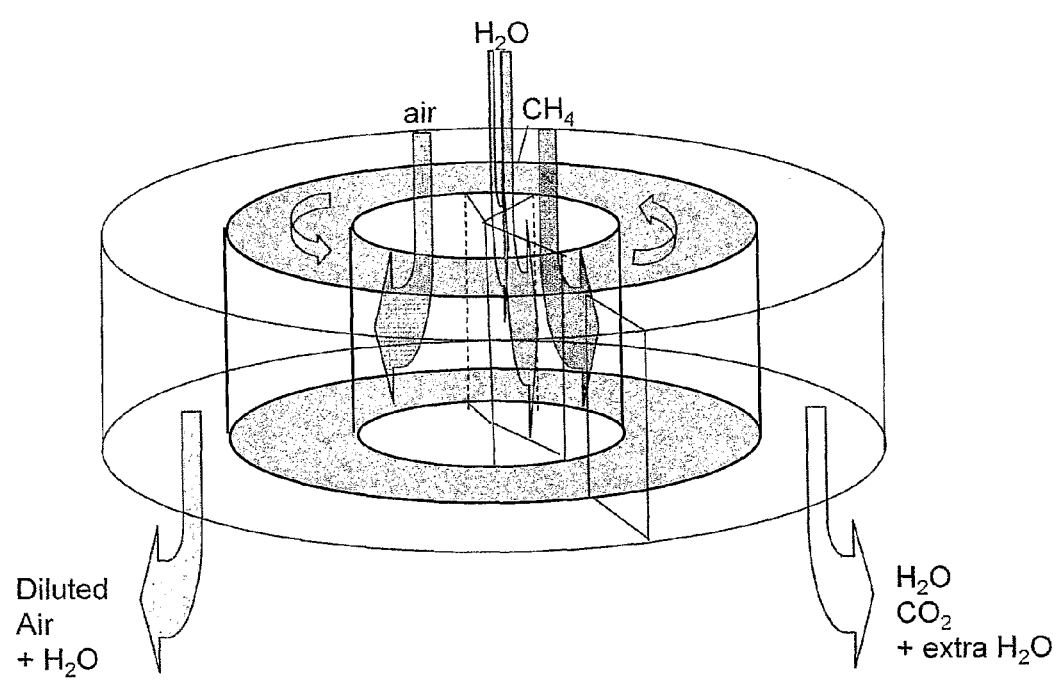

| | | | |
|---|---|---|---|
| 4,124,508 A * | 11/1978 | Capetanopoulos | 210/194 |
| 4,126,419 A * | 11/1978 | Katabuchi et al. | 422/109 |
| 4,770,857 A * | 9/1988 | Ludwig | 422/111 |
| 5,016,547 A * | 5/1991 | Thomason | 110/211 |
| 5,079,105 A * | 1/1992 | Bossel | 429/455 |
| 5,460,789 A * | 10/1995 | Wilhelm | 422/173 |
| 5,628,968 A * | 5/1997 | Hug et al. | 422/173 |
| 5,688,399 A * | 11/1997 | Halff et al. | 210/178 |
| 5,871,349 A * | 2/1999 | Johnson et al. | 432/180 |
| 2004/0005492 A1* | 1/2004 | Keefer et al. | 429/34 |

* cited by examiner

CHEMICAL LOOPING COMBUSTION

CROSS-REFERENCE TO RELATED APPLICATIONS

The present application claims the benefit of priority to PCT/NO2007/000357 filed 11 Oct. 2007, which is hereby incorporated herein by reference in its entirety for all purposes, and claims the benefit of priority to Norwegian Patent Application No. 2006 4636 filed 11 Oct. 2006, which is also incorporated herein by reference in its entirety for all purposes.

STATEMENT REGARDING FEDERALLY SPONSORED RESEARCH OR DEVELOPMENT

Not applicable.

The present invention comprises a method and reactor for chemical-looping combustion involving at least two gases.

The continued discharge of $CO_2$ from the burning of fossil fuels is believed to lead to distinct climate changes, which again is feared to lead to worse general living conditions on our planet. Regarding the greenhouse effect, increase in atmospheric $CO_2$ is mostly responsible for increase in the earth's middle temperature. It is therefore important to find ways to produce energy from fossil fuels while at the same time making it simple to separate out $CO_2$ for later deposition in such a way that the $CO_2$ content in the atmosphere is not increased. Chemical looping combustion (CLC) is a technique with inherent separation of $CO_2$.

The principle of chemical-looping combustion according to the following reactions is one way of doing this:

$$M + xO_2 \rightarrow MO_{2x} \qquad (1)$$

$$2MO_{2y} + yCH_4 \rightarrow yCO_2 + 2yH_2O + 2M \qquad (2)$$

This means that there is a substance M, which can be oxidized in air, and which is able to bind the oxygen (or a part thereof) in the air to a solid or liquid substrate. This substrate is then removed from the air stream and transferred to a stream of gaseous hydrocarbons. Two separate gas streams are obtained, one of oxygen depleted air (main stream), and one of $CO_2 + H_2O$. An air stream containing less than 20% of the $CO_2$ produced, may be permissible. The $H_2O/CO_2$ stream should contain less than 5% nitrogen.

STATE OF THE ART

The object of separating the nitrogen in the air from the $CO_2$ and $H_2O$ made in the oxidation of hydrocarbons, can in the above reactions (1) and (2) be reduced to bringing the oxygen carrier from the oxidation zone to a reduction zone. Two methods describing this are known from prior art.

The simplest approach is to have two or more containers filled with the oxygen carrier, and to switch the air and hydrocarbon gas streams between these containers (B. M. Corbella, L. F. De Diego, F. Garcia-Labiano, J. Adanez, J. M. Palacios, Environ. Sci. Technol. 2005, 39, 5796). This method has the following disadvantages:

a. The method must have valves that function reliably for a long time at temperatures in excess of 1000° C.
b. Power producing equipment like gas turbines needs very smooth gas supplies to work properly. The switching operation usually results in pulsed gas streams, which is unwanted.

From WO 96/06303 there is known a second method comprising the use of a circulating fluidised bed. This method ensures smooth, pulse free operation, but may have the following disadvantages:

c. Abrasion on the oxygen carrier as fluidised bed particles. The fines produced may constitute a separation challenge, and a possible environmental problem.
d. The fines from the process may destroy power producing equipment like gas turbines Further, a rotating monolith type of reactor comprising an active material supported in the axial channels of the monolith is described in FR 2846710. The reactor rotates between axial flows of an oxidizing gas and a reducing gas producing separate streams of hot gases, one of them containing essentially carbon dioxide and water. The disadvantage of such a reactor setup being leakages due to the lack of available volume when the gas is expanded due to the gas heating caused by the exothermal nature of the combustion process. In addition, in the hydrocarbon oxidation sector there will be an increase in the molar number of gas molecules, while there will be a corresponding decrease on the air side.

Several oxygen carriers have been developed which usually consist of metaloxides like NiO, CuO, CoO, or any other reducible metal oxide dispersed on a more or less porous carrier like alumina, silica, zirconia, titania, or spinel structures or any other carriers that do not, or only to a minor degree, take place in the actual red-ox reactions etc. Other oxygen carriers are oxides which can easily change their oxidation state, e.g. simple oxides like $FeO_x$, or perovskite type materials like $LaFeO_3$.

U.S. Pat. No. 2,704,741 describes a process and apparatus for catalytic conversion of fluid organic reactants to other fluid organic products in a reactor comprising a rotatable vessel with a catalyst. The catalytic mass is divided into a multiplicity of radial extending chambers in which the fluid organic reactants flow radially through. These chambers are physically separated from each other.

U.S. Pat. No. 2,739,928 and U.S. Pat. No. 2,934,495 describe reactors similar to U.S. Pat. No. 2,704,741 and are incorporated herein by references.

The object of the present invention is to produce energy from fossil fuels while at the same time make it simple to separate out $CO_2$ for later deposition in such a way that the $CO_2$ content in the atmosphere is not increased. The present invention accomplishes efficient, simple and economically favourable process for chemical looping combustion, compared to prior art.

DESCRIPTION OF THE INVENTION

The present invention comprises method of chemical looping combustion involving at least two gases in a reactor in which:

said at least two gases are conveyed to a reactor fluid inlet centre which is divided in at least two sectors;
said at least two gases flow radially outward through a continuous solid oxygen carrier bed that surrounds said fluid inlet center, said oxygen carrier bed comprising an active material, in which at least one reaction takes place between said active material and said at least two gases;
effluents from said at least one reaction are conveyed to an outer compartment of the reactor, said compartment being divided in at least two sectors by means of radially extending partition walls,
said fluid inlet centre, said oxygen carrier bed and said outer compartment are rotating relative to each other.

Further, the present invention comprises a method of chemical looping combustion involving at least two gases in which:

said at least two gases are conveyed to a fixed reactor fluid inlet centre which is divided in at least two sectors;

said at least two gases flows radially outwards into a rotating oxygen carrier bed that surrounds said fixed fluid inlet centre; said oxygen carrier bed comprising an active material, in which at least one reaction takes place;

effluents from at least one reaction are conveyed to a fixed outer compartment of the reactor, said compartment being divided in at least two sections by means of radially extending partition walls.

The object of the present invention being a method of chemical looping combustion in which the different reactive gases flow radially in separate sectors from the reactor fluid inlet centre, through the active material of the oxygen carrier bed, to the outer compartment of the reactor. These sectors of reacting gases are separated by sectors of steam. The reactor contains a solid oxidizing agent which is formulated to minimize non-radial gas diffusion while allowing gas expansion and contraction. The predominantly radial gas flow minimizes the sideways mixing of gases caused by the increase in gas volume during the process. This leads to negligible gas mixing and thus increased separation potential for carbon dioxide.

U.S. Pat. No. 2,704,741 comprises catalytic cracking of hydrocarbons in a reactor in which the hydrocarbons flow radially into radial extending chambers which are physically separated from each other by walls. The present invention differs substantially from U.S. Pat. No. 2,704,741 in that the present invention comprises chemical-looping combustion in a reactor which is not separated into radial extending sections by means of radial walls. The present invention comprises a combustion reactor in which the combustion products ($CO_2$ and $H_2O$) are separated from $N_2$ in air, i.e. no conversion of organic reactants into other organic reactants, no catalysts, no regeneration of catalyst. In the present invention there are no problems due to expansion of the different gases or problems with leakage or side diffusion between the different sections since there are no fixed walls in the oxygen carrier bed.

This provides that the radial increase in volume diminishes the back and side diffusion of gases leading to negligible gas mixing and thus increased separation potential of carbon dioxide.

The present invention comprises a method of chemical looping combustion involving at least two gases in which a first gas among said at least two gases is a reducing gas, preferably a hydrocarbonous gas, most preferably natural gas. Further, another gas among said at least two gases, which is conveyed to the sector opposite of the sector receiving the reducing gas, is an oxidizing gas, preferably air or oxygen depleted air. The sectors adjacent the sectors receiving said reducing and oxidizing gases, convey inert gas, preferably water vapour, to avoid direct contact between the reducing and oxidizing gases. The active material comprised in the present invention is an oxygen carrier, preferably sintered particles or powder formulated in order to minimize non-radial gas flow through the rotating part of the reactor. Further, the products of the oxidation of the reductive gas in the present invention are collected in at least one of the outer radially extending compartments. Further, the effluent from the oxidizing gas is collected in at least one of the outer radially extending compartments. In a first embodiment of the present invention said reactor fluid inlet centre and said outer compartment are fixed, and said oxygen carrier bed is rotating. In a second embodiment, said reactor fluid inlet centre and said outer compartment are rotating, and said oxygen carrier bed is fixed.

The formulated material will appear in a way that will not prevent radial gas diffusion. The formulated material can be shaped with different structures, e.g. honeycomb structures, pores which extend radially outwards in the rotating reactor, fibers/filaments which extend radially outwards. The intention of the present invention is to distribute the gas continuously over the area of the reactor. The thickness of the oxygen carrier may vary due to the rotation speed, kinetics, flow velocity etc. A thin layer of the oxygen carrier is preferred in order to minimize the gas mixing due to non radial gas flow.

The present invention also comprises a reactor for chemical looping combustion, comprising the following:—a fluid inlet centre which is divided in at least two sectors, an oxygen carrier bed comprising an active material, and an outer compartment divided in two sectors by means of radially extending partition walls, in which said fluid inlet centre, said oxygen carrier bed and said outer compartment are rotating relative to each other.

The reactor comprises an active material, preferably an oxygen carrier. The active material/particles can be used as a powder or it can be sintered into one piece. The reactor comprises a wire basket if a powder is preferred. In a third embodiment, the invention comprises a reactor in which said fluid inlet centre and said outer compartment are fixed, and said oxygen carrier bed is rotating. In a fourth embodiment, said fluid inlet centre and said outer compartment are rotating, and said oxygen carrier bed is fixed.

Further embodiments of the invention will now be described with reference to the following figures.

FIG. 1 shows the most preferred embodiment of the present invention in which a fluid reactor centre and an outer compartment are fixed. The fluid rector centre is divided into four sectors. One of the sectors receives a reducing gas, preferably a hydrocarbonous gas, most preferably natural gas. The sector opposite of the sector receiving the reducing gas, is an oxidizing gas, preferably air or oxygen depleted air. The sectors adjacent the sectors receiving the reducing and oxidizing gases, convey inert gas, preferably water vapour. The oxygen carrier bed in FIG. 1, in which at least one reaction takes place, is rotating while at least two gases flows radially outwards from the fixed reactor centre. The products of the oxidation of the reductive gas are collected in at least one of the outer compartments. Effluent from the oxidizing gas is collected in at least one of the other outer compartments.

Figure 2:
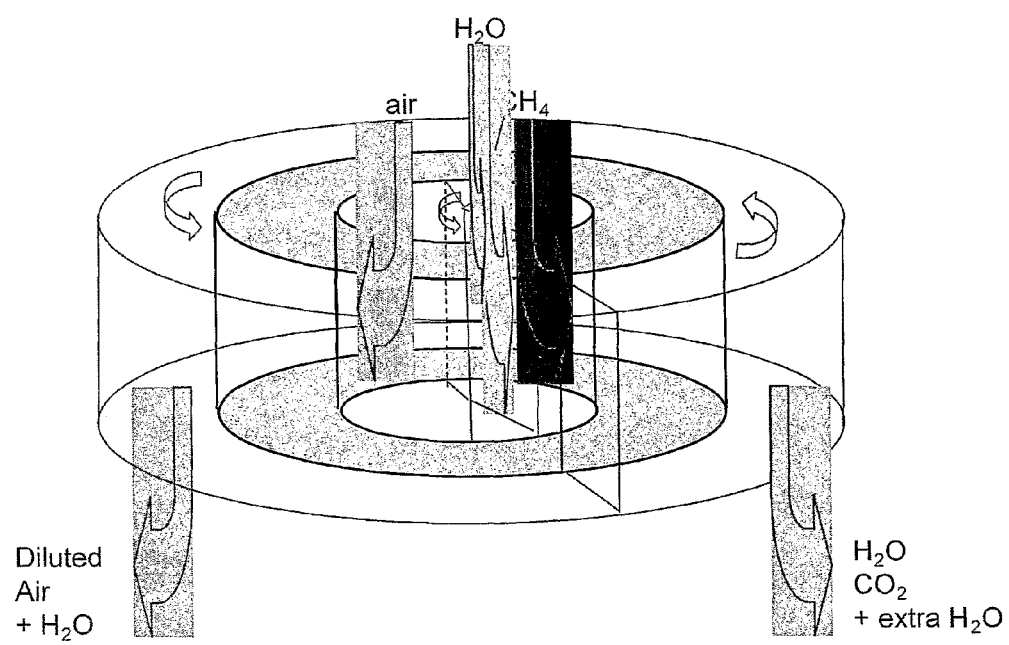

FIG. 2 shows a second embodiment of the present invention which is similar to the embodiment of FIG. 1 except that said reactor fluid inlet centre and said outer compartment are rotating and the oxygen carrier bed is fixed.

Figure 3:
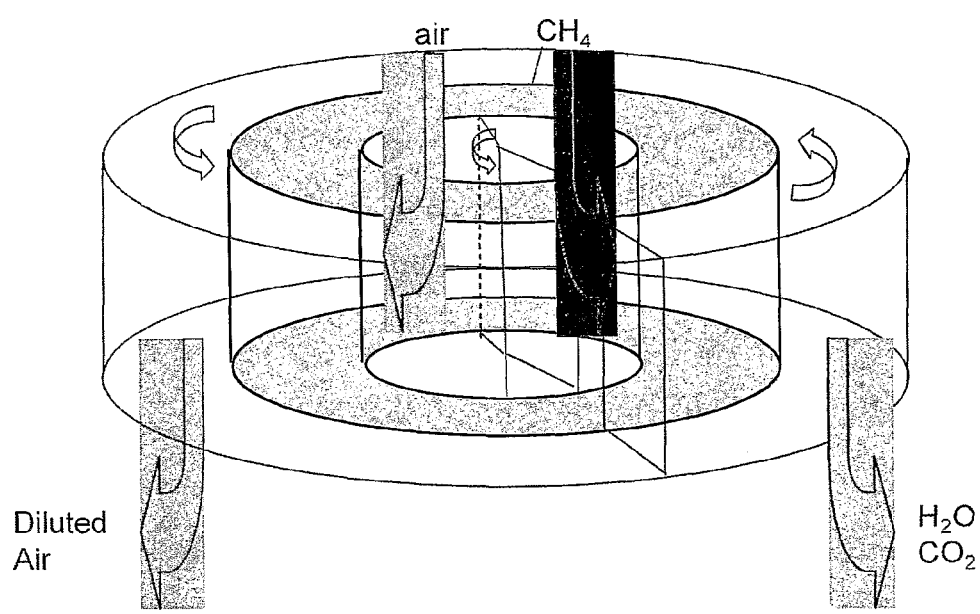

FIG. 3 shows a third embodiment of the present invention involving at least two gases in a reactor in which the reactor fluid inlet centre is divided in at least two sectors. One of the sectors receives a reducing gas, preferably a hydrocarbonous gas, most preferably natural gas. The sector opposite of the sector receiving the reducing gas, is an oxidizing gas, preferably air or oxygen depleted air. The rector fluid inlet centre and outer compartment are rotating while the oxygen carrier bed is fixed.

Figure 4:
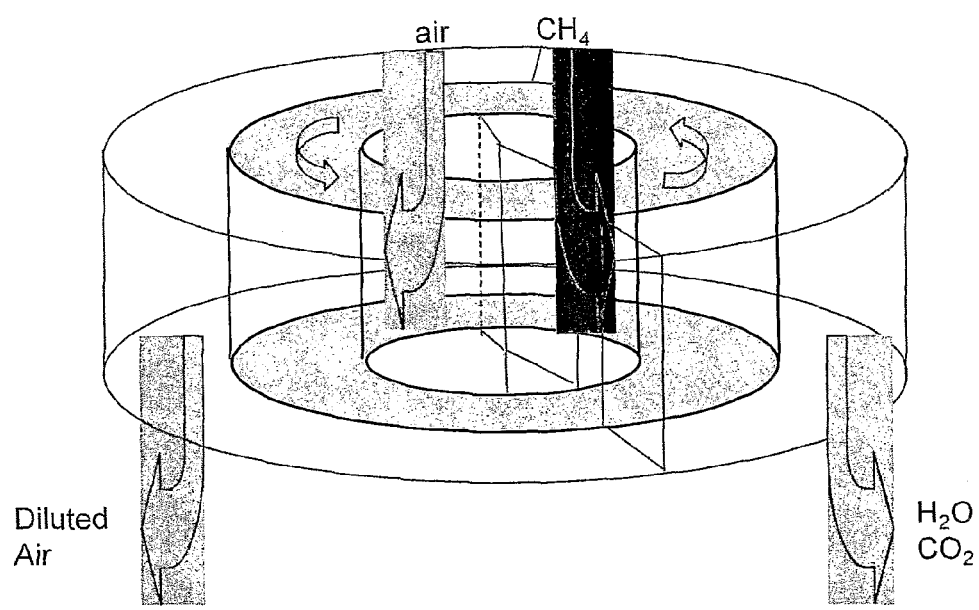

FIG. 4 shows a fourth embodiment of the present invention involving at least two gases in a reactor in which the reactor fluid inlet centre is divided in at least two sectors. One of the sectors receives a reducing gas, preferably a hydrocarbonous gas, most preferably natural gas. The sector opposite of the sector receiving the reducing gas, is an oxidizing gas, preferably air or oxygen depleted air. The rector fluid inlet centre and outer compartment are fixed while the oxygen carrier bed rotates.

By having a bed of oxygen carrier in a suitable physical form, one can let this bed rotate (FIG. 1) in such a way that the material goes through the following feed cycle:

A. A flow of air.
B. A flow of steam
C. A flow of hydrocarbon
D. A flow of steam On the effluent side there are two effluent channels.

E. Effluent oxygen depleted air+steam
F. Effluent oxidation products+steam

At least one of the effluents (E and F) is directed to a power producing equipment like a gas turbine. Alternatively, a construction of the reactor can be made where the reactive bed is stationary while the feed and exhaust sections rotate.

The oxidation products containing effluent will, after passing the power producing equipment be cooled, the water condensed out, and pure $CO_2$ is obtained which now can be processed further.

Thus, the steam zones will act as a separating barrier between the oxygen depleted air stream, and the $CO_2$ containing oxidation product stream. Accordingly, it will be obtained both that there are only traces of $CO_2$ in the oxygen depleted air exhaust (this is the $CO_2$ that will be released to the atmosphere), and only traces of $N_2$ in the $CO_2+H_2O$ stream. The gas compositions and thus the degree of separation obtained can be measured by using standard gas analysis techniques such as gas chromatography, mass spectrometry or infrared analysis, or any other techniques that can measure the individual gas constituents in a quantitative manner. Thus, the present invention simplifies the later compression, transportation and sequestration or utilisation of the $CO_2$.

EXAMPLE

The active material (1) in FIG. 1 is an oxygen carrier which most preferably is formulated to give negligible back mixing of gas and low pressure drop over the bed. The formulated active particles can either be used as a powder or it can be sintered into one piece. If a powder is used, a basket should be used to keep the powder in position when running the reactor.

Gases are fed into the active phase from the fluid inlet centre. The fluid inlet centre is split into at least two sectors: One sector where the reducing gas is fed, preferably a hydrocarbonous gas or gas mixture such as for example natural gas. In the two neighbouring sectors an inert gas is fed, preferably water vapour, while in the opposite sector an oxidizing gas is fed, preferably air or oxygen depleted air.

The reactive gases diffuse radially into the active phase, react with this and the products continue the radial flow to a compartment on the outside of the active phase where it is collected. The outer compartment is split into two chambers: One chamber where primarily the products from the oxidation of the reductive gas is collected and one where the effluent gas from the oxidizing gas is collected. Each of the two chambers has further tubing for transportation of the effluent gases for further processing.

The total ratio of (air (+optionally recycled exhaust)+ steam)/amount $CH_4$ will determine the exit temperature for the gases: For a stoichiometric mixture of methane+air (approximately 10 $m^3$ air/$m^3$ methane) the adiabatic temperature rise is >2000° C.

If a total temperature rise of around 1000 C is requested, there must be added an extra amount of air=15 $m^3/m^3$ methane, i.e. the total air/methane ratio is now approximately 25, or an additional amount of steam representing the same total heat capacity.

On the effluent side there is a change in the flows of both the carbon containing and the air depleted streams. This is partly due to the removal of some of the 21 vol % $O_2$ in the oxygen depleted air stream, and the large increase in the carbon containing stream from $CH_4$ to $CO_2+2H_2O$. The total number of moles is however not influenced. The increase of the volume flow in the carbon containing gas stream must be allowed for in the construction of the structure of the bed of oxygen carrier.

The rotation frequency of the fluid inlet centre, oxygen carrier bed or outer compartment should be adjusted to the amount of oxygen carrier, the rates of the reactions and the gas flows used, to assure nearly complete conversion of natural gas.

Having described preferred embodiments of the invention, it will be apparent to those skilled in the art that other embodiments incorporating the concepts may be used. These and other examples of the invention illustrated above are intended by way of example only and the actual scope of the invention is to be determined from the following claims.

The invention claimed is:

1. A method of chemical looping combustion including:
introducing gases to a reactor via a reactor fluid inlet centre which is divided into sectors;
allowing the gases to flow radially outward through a continuous solid oxygen carrier bed that surrounds the fluid inlet center, the oxygen carrier bed including an active material;
allowing a reaction to take place between the active material and the gases, wherein the gases are separated within the oxygen carrier bed by sectors comprising inert gases; and
conveying effluents from the reaction to an outer compartment of the reactor, the compartment being divided into sectors by means of radially extending partition walls;
the fluid inlet centre, the oxygen carrier bed, and the outer compartment rotating relative to each other.

2. The method of claim 1, wherein the gases include a reducing gas.

3. The method of claim 2, wherein the reducing gas is a hydrocarbonous gas.

4. The method of claim 2, wherein the reducing gas is natural gas.

5. The method of claim 2, wherein the gases include an oxidizing gas, which is introduced to the reactor fluid inlet centre at a sector opposite of the sector receiving the reducing gas.

6. The method of claim 5, wherein the effluent of the oxidizing gas is collected in at least one of the sectors of the outer compartment of the reactor.

7. The method of claim 5, wherein the oxidizing gas is air.

8. The method of claim 5, wherein the oxidizing gas is oxygen depleted air.

9. The method of claim 1, wherein the active material includes an oxygen carrier.

10. The method of claim 9, wherein the oxygen carrier is sintered particles or powder.

11. The method of claim 1, wherein the products of the reaction are collected in at least one of the sectors of the outer compartment of the reactor.

12. The method of claim 1, wherein the fluid inlet centre and the outer compartment are fixed, and the oxygen carrier bed is rotating.

13. The method of claim 1, wherein the fluid inlet centre and the outer compartment are rotating, and the oxygen carrier bed is fixed.

14. The method of claim 1, wherein the inert gas is water vapor.

15. A reactor for chemical looping combustion, including:
   a fluid inlet centre divided into sectors;
   an oxygen carrier bed including an active material and surrounding the fluid inlet centre; and
   an outer compartment divided into sectors by means of radially extending partition walls, the outer compartment surrounding the oxygen carrier bed;
   wherein the fluid inlet centre, the oxygen carrier bed and the outer compartment are rotatable relative to each other.

16. The reactor of claim 15, wherein the oxygen carrier bed includes a wire basket.

17. The reactor of claim 15, wherein the fluid inlet centre and the outer compartment are fixed, and the oxygen carrier bed is rotatable.

18. The reactor of claim 15, wherein the fluid inlet centre and the outer compartment are rotatable, and the oxygen carrier bed is fixed.

\* \* \* \* \*

UNITED STATES PATENT AND TRADEMARK OFFICE
CERTIFICATE OF CORRECTION

PATENT NO. : 8,672,671 B2  Page 1 of 1
APPLICATION NO. : 12/444726
DATED : March 18, 2014
INVENTOR(S) : Dahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this
Twenty-ninth Day of September, 2015

Michelle K. Lee
*Director of the United States Patent and Trademark Office*